ated Mar. 21, 1911.
UNITED STATES PATENT OFFICE.

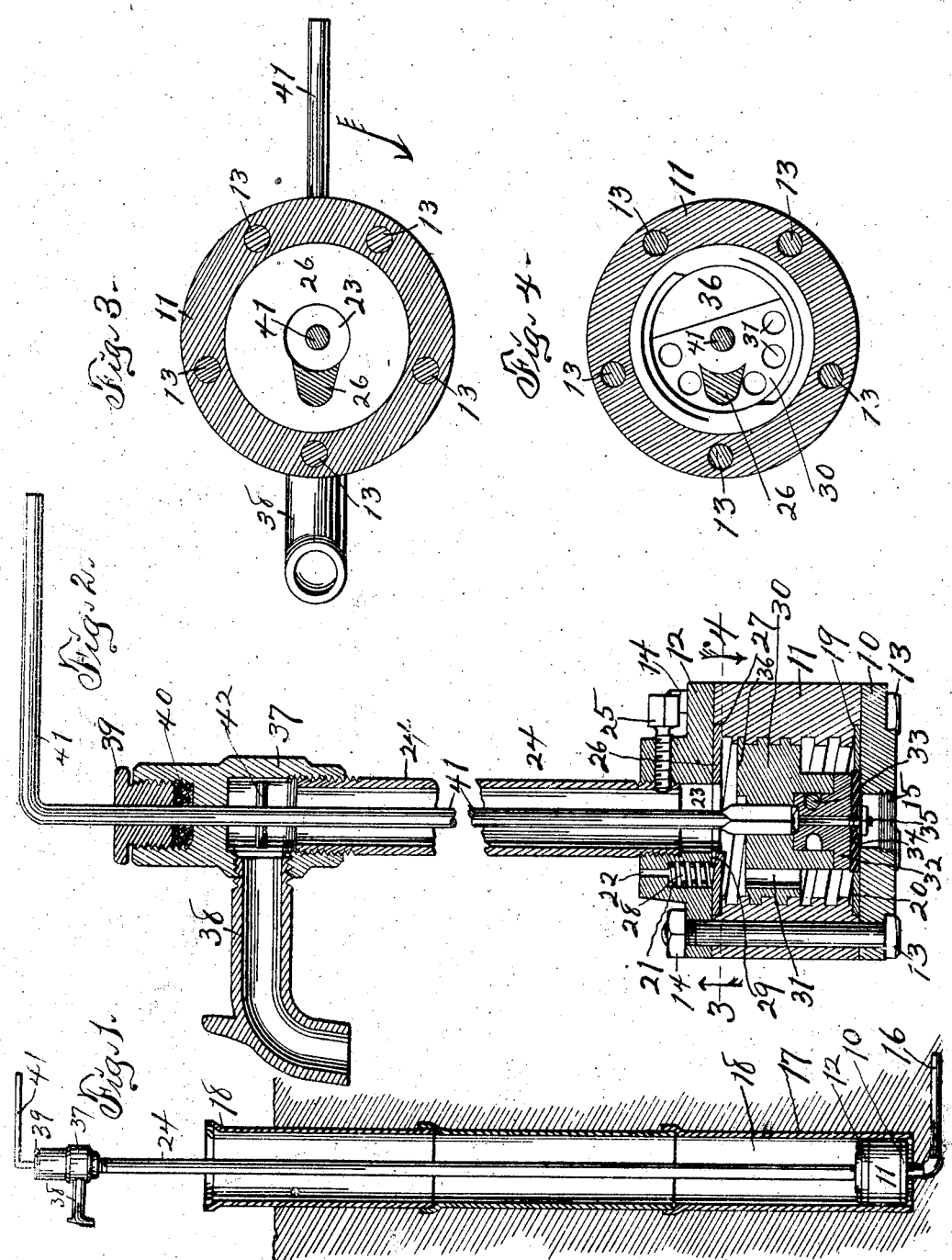

ALBERT CERANEK, OF AUDUBON, IOWA.

HYDRANT.

987,614.

Specification of Letters Patent.  Patented Mar. 21, 1911.

Application filed August 15, 1910. Serial No. 577,181.

*To all whom it may concern:*

Be it known that I, ALBERT CERANEK, a citizen of the United States of America, and resident of Audubon, Audubon county, Iowa, have invented a new and useful Hydrant, of which the following is a specification.

The object of this invention is to provide an improved construction for hydrants whereby said hydrant can be removed from and replaced in the ground and in relation to a service pipe without excavating.

My invention consists in the construction, arrangement and combination of elements hereinafter set forth, pointed out in my claims and illustrated by the accompanying drawing, in which—

Figure 1 is an elevation, partly in section, showing a complete hydrant in position for practical use. Fig. 2 is a vertical section of a hydrant illustrating the construction thereof, portions of a water pipe and key rod being broken away to economize space. Fig. 3 is a cross-section on the indicated line 3—4 of Fig. 2, looking upward. Fig. 4 is a cross-section on the indicated line 3—4 of Fig. 2, looking downward.

In the construction of the device as shown a valve chamber is built up of a base plate 10, a cylinder 11 and cap plate 12 detachably connected by bolts 13 extending through them. The bolts 13 preferably are arranged with their heads directed downwardly and nuts 14 on their upper ends. A threaded aperture 15 is formed in the center of the base plate 10 and is adapted to be screwed on an upturned end portion of a service pipe 16, which service pipe preferably is located under ground, below the frost line and at the bottom of a well or box 17 lined with a casing or tiling 18. The casing or tiling 18 is of an interior diameter such as will admit the valve chamber for free rotary and vertical movement therein. The cylinder 11 is formed with a rabbet 19 on its lower end and a washer plate 20 is mounted in said rabbet and extends over the central portion of the base plate 10 concentric with the threaded aperture 15. The cap plate 12 is formed with a recess or chamber 21 at one side of its center, which recess or chamber opens to the cavity of the cylinder 11. The cap plate 12 also is formed with a vent or waste port 22 opening through its top from the upper end of the recess 21 and, together with said recess, forming a discharge from the interior of the cylinder 11. The cap plate 12 also is formed with a central threaded aperture 23 and a pipe 24 is screwed at its lower end into said threaded aperture and is secured rigidly therein by a set screw 25. A washer 26, preferably made of leather, is mounted in a rabbet 27 in the upper end of the cylinder 11 concentric with the threaded aperture 23. The washer 26 is formed with a central opening registering with the aperture 23 and said washer extends at one side across the recess 21. An expansive coil spring 28 is mounted in the recess 21 and impinges at its ends respectively on the upper face of the washer 26 and the upper end wall of the recess. The spring 28 preferably is spiral and does not obstruct the discharge through the recess 21 and waste port 22. It is the function of the spring 28 to depress a portion of the washer 26 at times and in so doing open a space or passageway 29 between said washer and a portion of the cap plate 12 so that liquid may pass from the interior of the cylinder 11 to the recess 21. A screw member or block 30 is mounted in the cylinder 11 and is formed with a double screw on its periphery mating with a double screw on the interior of said cylinder. The block 30 is formed with passages or ports 31 from top to bottom and in a row concentric with its center, which provide means for the passage of liquid vertically through said block. The lower end portion of the block 30 is centrally chambered and a valve plug 32 is mounted in said chamber and is secured by a removable and replaceable key 33. A washer valve 34 is mounted on the lower end of the plug 32 and is secured thereto by a bolt 35. The washer valve 34 preferably is made of rubber and has some flexibility of movement relative to the plug 32. The valve 34 extends across the threaded aperture 15 and seats on the upper surface of the base plate 10. The block 30 is formed with a plateau or boss 36 of segment form on and elevated relative to its upper surface. It is the function of the plateau or boss 36 to engage and lift the depressed portion of the washer 26 at times and in so doing close the passageway 29. A head member 37 is screwed on the upper end portion of the pipe 24 and is provided with a laterally extending spout 38, a gland 39 in its upper end and packing 40 beneath the gland. The block 30 is formed with a central aperture angular in cross-section and a key rod 41 is mounted through the gland 39 and extends through the head member 37, the pipe 24 and aperture 23. The key rod 41 is formed with an angular lower end portion adapted for engagement with and in the aperture in the center of the block 30. A pin or key 42 is mounted transversely of the key rod 41 within the head member 37 and limits upward movement of said key rod.

In practical use the parts are assembled, in closed position, as shown in the drawing. In such position the block 30 is at its lowermost limit of movement and holds the valve 34 in closed relation to the aperture 15 so that no liquid can pass through said aperture into the cylinder 11. In this position also any liquid contained in the pipe 24 may descend by discharge of a like quantity of liquid from the cylinder through the passageways 31, recess 21 and waste port 22. When it is desired to draw liquid through the hydrant from the service pipe 16 the key rod 41 is rotated manually in the direction of the arrow in Fig. 3 approximately one-third a revolution. Such movement of the key rod 41 rotates the block 30 and causes it to rise by its threaded engagement with the cylinder 11 to the top of said cylinder, thus raising the valve 34 from its seat and permitting the passage of liquid from the service pipe through the threaded aperture 15, the lower portion of the cylinder, the ports 31, the upper portion of the cylinder, the threaded aperture 23, the pipe 24, the head member 37, and the spout 38. In the rotation and ascent of the block 30 the segmental plateau or boss 36 travels beneath and in engagement with and elevates the depressed portion of the washer 26 and closes the passageway 29 as above suggested. The closing of the hydrant is effected by reverse movement of the key rod 41 manually and in such closing the plateau or boss 36 is removed from the washer 26 and permits the spring 28 again to depress a portion of said washer and open the passageway 29 for the waste or discharge of the contents of the pipe 24. When it is desired to remove the hydrant for repair or substitution of any of its parts or for cleansing of the interior thereof, such removal is effected by use of pipe tongs or a wrench on the pipe 24 to the end of unscrewing the base plate of the valve chamber from the service pipe 16. After the valve chamber is unscrewed from the service pipe it may be lifted out of the casing or lining 18. The waste port is employed primarily to prevent freezing of water in the pipe 24 and some economy of time and water may be effected in nonfreezing weather by removing the spring 28 and allowing the washer 26 normally to close the recess 21. The removal and replacing of the spring 28 may be effected by removing the cap plate 12 from the cylinder 11 at any time when the hydrant is out of its casing.

I claim as my invention—

1. In a hydrant, a valve chamber, a rotary valve plug therein, said valve chamber formed with a waste port, a flexible washer subjacent to the waste port, said valve plug formed with a face adapted to engage said flexible washer and close the waste port.

2. In a hydrant, a valve chamber, a rotary valve plug therein, said valve chamber formed with a waste port, a flexible washer subjacent to the waste port, and an expansive coil spring in said waste port adapted to depress a portion of said flexible washer, said valve plug formed with a face adapted to engage said flexible washer and close the waste port.

3. In a hydrant, a valve chamber composed of a base plate, a cylinder and a cap plate rigidly connected, the base plate adapted to be screwed on a service pipe, a valve plug threaded in said cylinder, a pipe leading from the cap plate, a key rod extending through said pipe and detachably connected to said valve plug, said cap plate formed with a recess opening to the cylinder and also formed with a waste port opening from the recess to the exterior, a flexible washer subjacent to the cap plate and underlying said recess, a spring in said recess adapted to depress a portion of the flexible washer at times, the valve plug formed with a contacting face adapted to engage and raise the depressed portion of the flexible washer against the resilience of the spring, the valve plug formed with vertical ports.

4. In a hydrant, a valve chamber composed of a base plate, a cylinder and a cap plate rigidly connected, the base plate adapted to be screwed on a service pipe, a valve plug threaded in said cylinder, a pipe leading from the cap plate and rigidly yet removably secured thereto, a key rod extending through said pipe and detachably connected to said valve plug, said cap plate formed with a recess opening to the cylinder and also formed with a waste port opening from the waste port to the exterior, a flexible washer subjacent to the cap plate and underlying said recess, a spring in said recess adapted to depress a portion of the flexible washer at times, the valve plug formed with a contacting face adapted to engage and raise the depressed portion of the flexible washer against the resilience of the spring, the valve plug formed with vertical ports.

5. In a hydrant, a valve chamber composed of a base plate, a cylinder and a cap plate rigidly connected, the base plate adapted to be screwed on a service pipe, a block threaded in said cylinder, a valve plug detachably mounted in and depending from said block, a valve on said plug overlying the end of the service pipe, a pipe fixed to said cap plate and communicating through it with the cylinder, a key rod extending through said pipe and detachably connected to said block, said cap plate formed with a recess opening to the cylinder and also formed with a waste port opening from the recess to the exterior, a flexible washer subjacent to the cap plate and underlying said recess, a spring in said recess adapted to depress a portion of the flexible washer at times, the block formed with a contacting face adapted to engage and raise the depressed portion of the flexible washer against the resilience of the spring, the block formed with vertical ports.

Signed by me at Des Moines, Iowa, this tenth day of March, 1910.

ALBERT CERANEK.

Witnesses:
S. C. SWEET,
EARL M. SINCLAIR.